US011552538B2

(12) United States Patent
Urresty et al.

(10) Patent No.: US 11,552,538 B2
(45) Date of Patent: Jan. 10, 2023

(54) METHOD FOR REMOVING AN ELECTROMAGNETIC MODULE FROM AN ELECTRICAL MACHINE

(71) Applicant: General Electric Renovables España, S.L., Barcelona (ES)

(72) Inventors: Julio César Urresty, Barcelona (ES); Sadeo Ramtahal, Schenectady, NY (US); César Muñiz Casais, Barcelona (ES)

(73) Assignee: General Electric Renovables Espana, S.L., Barcelona (ES)

(*) Notice: Subject to any disclaimer, the term of this patent is extended or adjusted under 35 U.S.C. 154(b) by 168 days.

(21) Appl. No.: 16/937,249

(22) Filed: Jul. 23, 2020

(65) Prior Publication Data

US 2021/0028674 A1 Jan. 28, 2021

(30) Foreign Application Priority Data

Jul. 26, 2019 (EP) .................................... 19382641

(51) Int. Cl.
*H01F 7/06* (2006.01)
*H02K 15/00* (2006.01)
(Continued)

(52) U.S. Cl.
CPC ........... *H02K 15/0006* (2013.01); *F03D 9/25* (2016.05); *F03D 15/00* (2016.05); *F03D 80/60* (2016.05);
(Continued)

(58) Field of Classification Search
CPC ........ H02K 1/132; H02K 1/148; H02K 1/185; H02K 1/20; H02K 7/183; H02K 2213/12;
(Continued)

(56) References Cited

U.S. PATENT DOCUMENTS 5,914,552 A * 6/1999 Hsu ........................ H02K 1/278
310/156.18
9,712,004 B2 * 7/2017 Muñiz Casais ...... H02K 1/2786
(Continued)

FOREIGN PATENT DOCUMENTS

WO WO 2013/144288 A1 10/2013
WO WO 2014/001512 A1 1/2014

OTHER PUBLICATIONS

EPO Search Report, dated Dec. 4, 2019.

*Primary Examiner* — Paul D Kim (74) *Attorney, Agent, or Firm* — Dority & Manning, P.A.

(57) ABSTRACT

In a first aspect, a method for removing an electromagnetic module from an electrical machine is provided. The electrical machine comprises a plurality of electromagnetic modules having an electromagnetic material. The electromagnetic modules comprise base and a support extending from the base and supporting the electromagnetic material. The base comprises a bottom surface and a first side surface. The first side surface comprises an axially extending groove defining a cooling channel with an axially extending groove of a first side surface of an adjacent electromagnetic module. The method comprises inserting a rod in a cooling channel formed by the groove of the electromagnetic module to be removed and a groove of an adjacent electromagnetic module; releasing the electromagnetic module to be removed from a structure of the electrical machine; and sliding the electromagnetic module to be removed along the rod.

6 Claims, 7 Drawing Sheets

(51) Int. Cl.
  *F03D 9/25*    (2016.01)
  *F03D 15/00*   (2016.01)
  *F03D 80/60*   (2016.01)
  *H02K 1/18*    (2006.01)
  *H02K 1/20*    (2006.01)
  *H02K 7/18*    (2006.01)
  *H02K 21/14*   (2006.01)

(52) U.S. Cl.
  CPC ............... *H02K 1/185* (2013.01); *H02K 1/20* (2013.01); *H02K 7/1838* (2013.01); *H02K 21/14* (2013.01); *F05B 2230/70* (2013.01); *H02K 2213/12* (2013.01)

(58) Field of Classification Search
  CPC .. H02K 2201/15; H02K 7/1838; H02K 21/14; H02K 15/0006; H02K 15/02; F03D 80/60; F03D 9/25; F03D 15/00; F05B 2230/70
  See application file for complete search history.

(56) References Cited

U.S. PATENT DOCUMENTS

2011/0266811 A1* 11/2011 Smadja ................... H02K 1/278
                       290/55
2012/0133230 A1* 5/2012 Jansen ..................... H02K 15/03
                       29/596

* cited by examiner

METHOD FOR REMOVING AN ELECTROMAGNETIC MODULE FROM AN ELECTRICAL MACHINE

The present disclosure relates to electromagnetic modules for electrical machines having a cooling channel, and a method for removing an electromagnetic module from an electrical machine.

BACKGROUND

Electrical machines, such as motors and generators, generally comprise a rotor structure and a stator structure. Large electrical generators may be permanent magnet generators (PMG) or electrically excited generators.

Such generators may be used for example in wind turbines, in particular in offshore wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators or electrically excited generators may also be coupled to a gearbox which increases the rotational speed of the generator to for example between 50 and 500 rpm or even more.

Electrical machines comprise a rotor which rotates with respect to the stator. The rotor may be the inner structure and the stator the outer structure. The stator in this case thus surrounds the rotor. Alternatively, in some configurations it may be the opposite, i.e. the rotor surrounds the stator.

In case of permanent magnet generators (PMG), permanent magnets (PM) are generally arranged on the rotor (although they could also be arranged alternatively in the stator structure), whereas winding elements (e.g. coils) are usually included in the stator (although they could alternatively be arranged on the rotor structure). Permanent magnet generators are generally deemed to be reliable and require less maintenance than other generator typologies.

Multiple permanent magnets may be provided in permanent magnet modules, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor rim in such a way that the plurality of magnets is fixed together to the rotor rim through the module base. The use of permanent magnet modules may facilitate the manufacturing of a rotor.

The stator may generally comprise electrical or stator windings. Stator windings may be arranged in stator segments. A plurality of stator segments may be connected to a stator rim along the stator circumference. The stator segments may comprise a base configured to be fixed to stator rim and a tooth protruding from the base receiving a stator winding. A stator winding may be wound around the tooth. A stator segment may comprise a plurality of teeth and a plurality of stator windings wounded around each of the teeth. Accordingly, stator windings may be mounted and unmounted to or from the stator through the stator segments.

Using stator segments may facilitate the manufacturing of a stator and the replacement of malfunctioning stator or electrical windings.

The electromagnetic components of an electrical machine, e.g. permanent magnet modules and stator windings, may be cooled to reduce heat losses such that the performance of the electrical machine may be optimized. Air cooling channels may be provided in the stator and/or the rotor to cool the electromagnetic components. For example, air cooling channels may be formed in permanent magnet modules or in stator segments. However, large air cooling channels may weaken the structural behavior of the rotor or of the stator components.

Electromagnetic components, e.g. permanent magnet modules or stator segments, may be deteriorated during its use and may have to be repaired or replaced by another one. Electromagnetic components may thus have to be removed. However, electromagnetic components may be attracted by other electromagnetic components. For example, electromagnetic components associated with the stator are generally electromagnetically attracted by the electromagnetic components associated with the rotor. Accordingly, removing an electromagnetic component from the electrical machine may require counteracting the electromagnetic forces created between the electromagnetic components. This may also occur when an electromagnetic component is inserted in an electrical machine. These manufacturing or maintenance operations may make more difficult the design of the electromagnetic components and also of the electrical machine. This may specifically occur in electrical generators for direct drives wind turbines as the electromagnetic forces between the rotor and the stator are large.

The size and type of electrical machines and the potential problems described herein are not limited to generators in direct drive offshore applications, and not even to the field of wind turbines only. Electrical machines of considerable dimensions that may suffer from the same problems and/or have the same complications may also be found in e.g. steam turbines and water turbines.

The present disclosure provides examples of systems and methods that at least partially resolve some of the aforementioned disadvantages.

SUMMARY

In one aspect, a method for removing an electromagnetic module from an electrical machine having a rotor and a stator is provided. The electrical machine comprises a plurality of electromagnetic modules having an electromagnetic material, the electromagnetic material being one of a permanent magnet and a stator winding. The electromagnetic modules comprise base and a support extending from the base and supporting the electromagnetic material. The base comprises a bottom surface and a first side surface. The first side surface comprises an axially extending groove defining a cooling channel with an axially extending groove of a first side surface of an adjacent electromagnetic module. The method comprises inserting a rod in a cooling channel formed by the groove of the electromagnetic module to be removed and a groove of an adjacent electromagnetic module; releasing the electromagnetic module to be removed from a structure of the electrical machine; and sliding the electromagnetic module to be removed along the rod.

According to this aspect, the cooling channel formed by the grooves of two neighboring electromagnetic modules may be used for inserting a rod to counteract the electromagnetic forces inside the electrical machine acting on the electromagnetic module to be extracted. For example, if the electromagnetic module to be removed is a stator module, the permanent magnets arranged at the rotor may attract the stator module. Electromagnetic forces may thus be created between electromagnetic modules arranged at the stator and electromagnetic modules arranged at the rotor. The rod may be radially retained inside the groove of the adjacent electromagnetic module. The electromagnetic module to be removed may slide along the rod in such a way that the rod retains or maintains the radial position of the electromagnetic module. Radial displacements of the electromagnetic modules, for example from the stator to the rotor, may be prevented. Accordingly, a single channel has both functions: cooling the electromagnetic material and receiving a rod for removing one electromagnetic module. Forming several channels in an electromagnetic module with independent functions may thus be avoided. As a result, weakening the structural behavior of the electromagnetic module may be prevented and a more compact electromagnetic module may be provided. In addition, as less channels in the base of an electromagnetic module are required, the magnetic flux through the electromagnetic module may be optimized and the electrical efficiency of the electrical machine may be improved.

In a further aspect, a method for inserting an electromagnetic module in an electrical machine is provided. Then electrical machine comprises a rotor, a stator and a plurality of electromagnetic modules having an electromagnetic material. The electromagnetic material is one of a permanent magnet and a stator winding. The electromagnetic modules comprise a base and a support extending from the base and supporting the electromagnetic material. The base comprises a bottom surface and a first side surface. The first side surface comprises an axially extending groove, the axially extending groove is configured to define a cooling channel with an axially extending groove of a first side surface of an adjacent electromagnetic module. The method comprises inserting a rod in the groove of an electromagnetic module attached to a structure of the electrical machine, inserting a portion of the rod in a portion of the groove of the electromagnetic module to be inserted, sliding the electromagnetic module to be inserted along the rod to position the electromagnetic module to be inserted adjacent to the electromagnetic module attached to the structure of the electrical machine, and attaching the electromagnetic module to the structure of the electrical machine.

According to this aspect, the cooling channel formed by the grooves of two neighboring electromagnetic modules may be used for inserting an electromagnetic module in an electrical machine. Similar to removing an electromagnetic module, the rod may radially retain the electromagnetic module being inserted in the electrical machine.

In yet a further aspect, a stator segment is provided. The stator segment comprises a base and a tooth protruding from the base receiving a stator winding. The base comprises a bottom surface and a first side surface having an axially extending groove. The groove comprises an upper surface and a lower surface. The groove is configured to form a cooling channel with an axially extending groove of a first side surface of an adjacent stator segment. The cooling channel is further configured to receive a rod for removing the stator segment from a stator rim and to cool the stator winding.

According to this aspect, the cooling channel may be used for cooling the stator winding and for facilitating the extraction or insertion of the stator segment in an electrical machine. During the extraction or insertion of the stator segment, a rod may be inserted in the cooling channel formed by the groove of the stator segment to be removed and the groove of an adjacent stator segment. Furthermore, as the cooling channel is arranged close to the stator winding, the cooling may be improved and the electrical efficiency of the electrical machine may thus be increased. Cooling channels commonly arranged in the stator core may thus be avoided. Consequently, the size of the stator, and consequently of the electrical machine, may be reduced.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
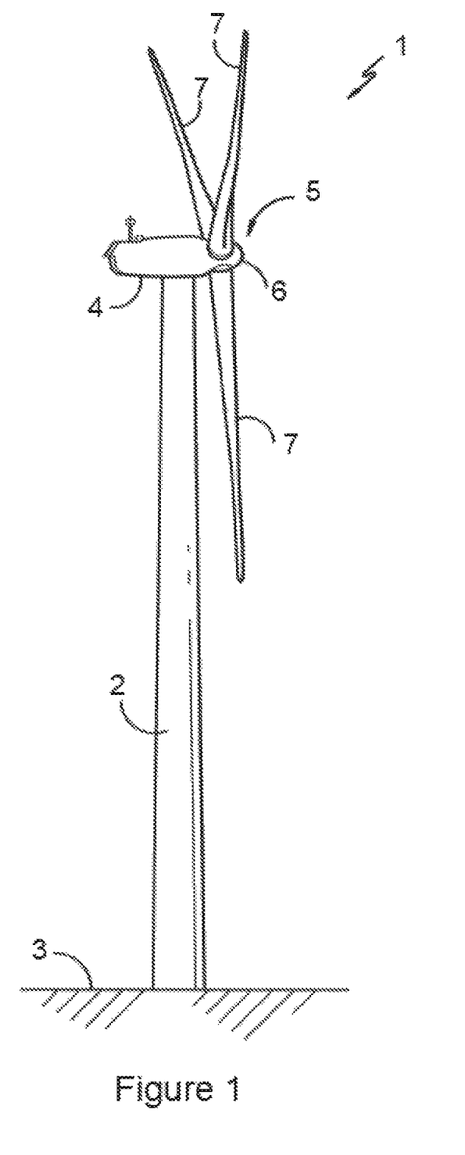
FIG. 1 illustrates a perspective view of a wind turbine according to one example of the present disclosure.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
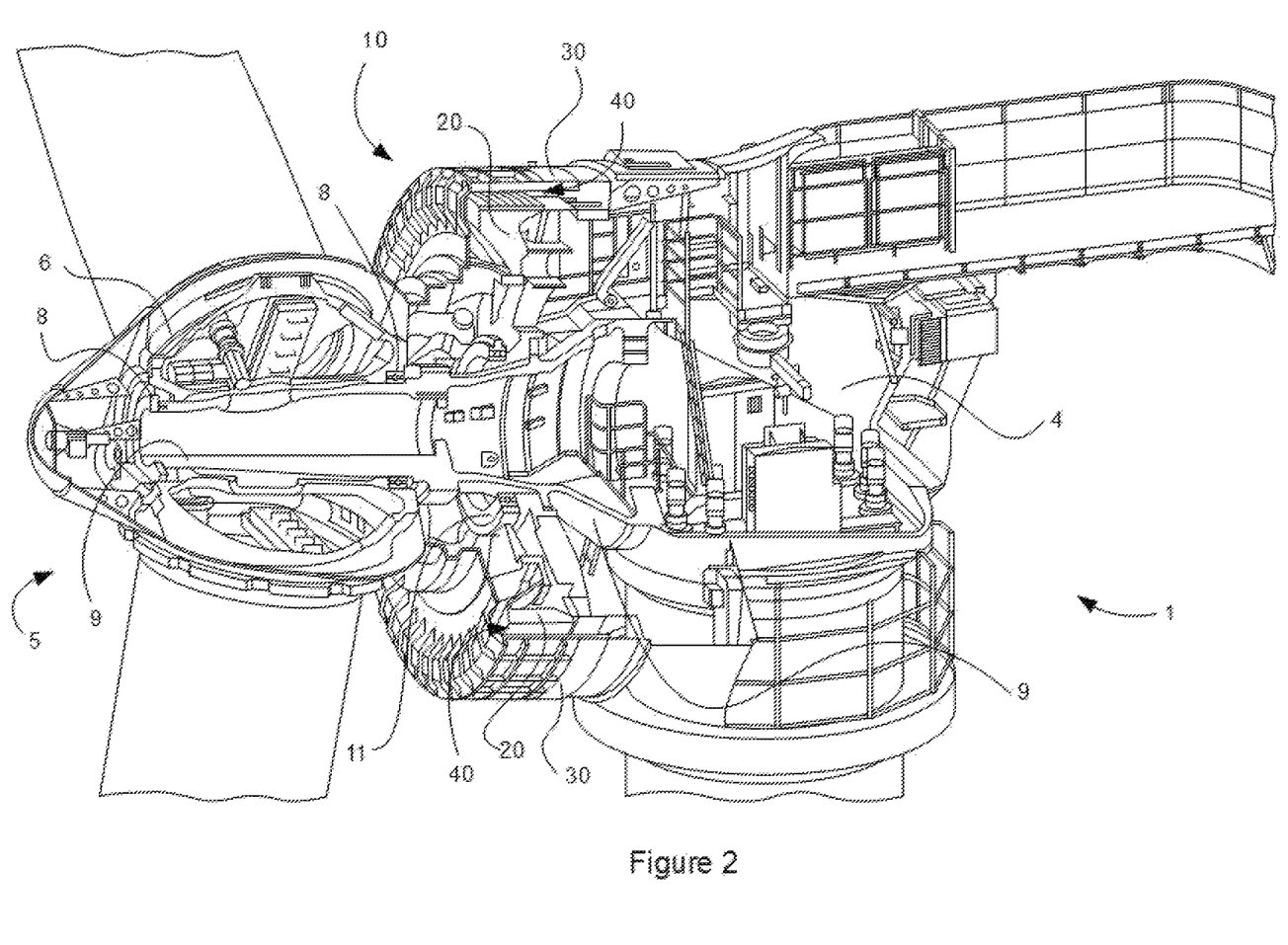
FIG. 2 illustrates a simplified, internal view of a nacelle of a wind turbine according to one example of the present disclosure.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 20 of a generator 10 for rotation therewith. The rotation of the hub 6 may thus drive the rotor 20 of the generator 10.

In FIG. 2, the wind turbine rotor 5 may be rotatably mounted on a support frame 9 through two rotor bearings 8. In other examples, the support frame 9 may not extend through the hub 6 and therefore the rotor may be supported by a single rotor bearing 8, commonly called as the main bearing.

The generator 10 may be electrically coupled to the converter. The wind turbine converter may adapt the output electrical power of the generator to the requirements of the electrical grid.

The generator 10 may comprise a rotor 20 and a stator 30. In FIG. 2, the stator 30 is surrounding the rotor 20, however, in other examples, the rotor may surround the stator. Between the stator 30 and the rotor 20 an air gap 40 is arranged. The stator may be rigidly mounted on the support frame 9. The rotor may be rotatably mounted on the stator through a generator bearing 11 so that the rotor may rotate with respect to the stator about a rotational axis. The rotor may extend from a first side, e.g. from inside the nacelle 4, to a second side, the wind turbine rotor 5.

Figure 3:
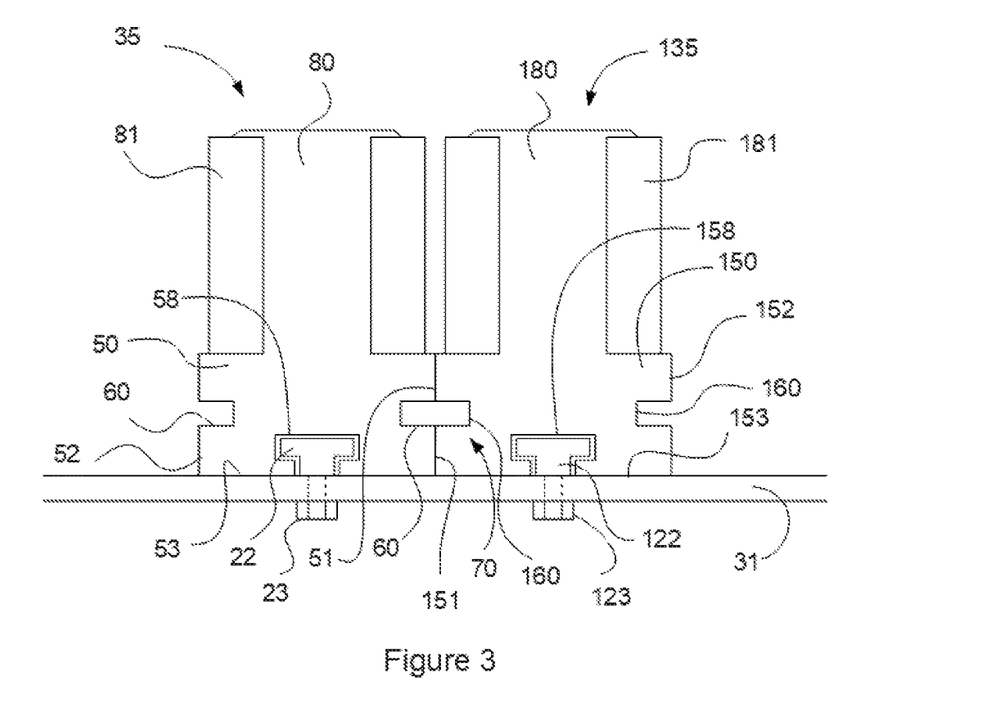
FIG. 3 schematically represents a cross-sectional view of two adjacent stator segments according to one example of the present disclosure.

FIG. 3 schematically represents a cross-sectional view of two adjacent stator segments according to one example of the present disclosure. A stator segment is an example of an electromagnetic module of an electrical machine.

The stator segments 35, 135 of FIG. 3 comprise a base 50, 150 and a tooth 80, 180 protruding from the base 50, 150 which receives a stator winding 81, 181. The base 50, 135 comprises a bottom surface 53, 153 and a first side surface 51, 151 having an axially extending groove 60, 160. The axially extending groove 60, 160 comprises an upper surface and a lower surface. In this example, the upper surfaces and the lower surfaces of the grooves are substantially flat.

The first side 51 of the stator segment 35 faces the first side 151 of the stator segment 135. The grooves 60 and 160 form a cooling channel 70. The cooling channel 70 is configured to receive a rod for removing one of the stator segments from a stator rim 31. The cooling channel 70 is further configured to remove heat from the stator windings 81 and 181. In some examples, the cooling channel 70 is further configured to receive a rod for inserting a stator segment in an electrical machine.

The upper surface and the lower surface of the grooves of this figure are substantially parallel to each other. The upper surface and the lower surface may extend substantially perpendicular to the first side surface. In this example, the cooling channel 70 has a substantially rectangular shape.

In this example, the stator segments 35, 135 further comprise a second side surface 52, 152 comprising an axially extending groove 60, 160 having an upper surface and a lower surface. The groove arranged at the first side surface may be similar to the groove of the second side surface.

The teeth 80, 180 of FIG. 3 extend substantially perpendicular to the bottom surface 53, 153 of the base. In this example, the first 51, 151 and the second side surfaces 52, 152 are substantially parallel to each other. In addition, these side surfaces are substantially perpendicular to the bottom surface 53, 153.

A rod may be held or retained between the upper surface and the lower surfaces of a groove. The upper surface of the groove may contact an upper surface of a rod inserted in the cooling channel. The upper surface of the groove may thus limit a radial movement of the rod inside the cooling channel. Similarly, the lower surface of the groove may contact a lower surface of a rod inserted in the cooling channel to limit a radial movement of the rod.

A half portion of the upper surface and a half portion of the lower surface of the rod may respectively contact the upper and lower surfaces of the one of the grooves. One half portion of the rod may be substantially held by one of the grooves, whereas the other half portion of the rod may be substantially retained by the other groove that defines the cooling channel.

In this example, the stator segments 35, 135 are connected to a stator rim 31 through a fastener or a plurality of fasteners. Particularly, the base comprises an axial recess 58, 158 receiving an anchor 22, 122. The anchor 22, 122 may fit the shape of the recess 58, 158 to maintain the stator segment in place. The anchor may comprise a threaded hole at which a fastener or a bolt 23, 123 may be screwed to connect the anchor 22, 122 to the stator rim 31. The bolt 23, 123 may pass through a radial hole provided on the stator rim 31 to fix the stator segment to the stator rim. The anchor may thus be tightened to press the stator segment against the stator rim.

In some examples, the anchor may comprise a plurality of threaded holes distributed along its length to receive a plurality of bolts passing through a plurality of holes arranged at the stator rim. A plurality of connections may thus be stablished between the stator segments and the stator rim.

The anchor 22, 122 of the FIG. 3 is substantially T-shaped. In other examples, the anchors may be of a suitable shape to fit a recess of the base of the stator segment.

In other examples, a fastener or a plurality of fasteners may directly connect the stator segment to the stator rim.

In the example of FIG. 3, the stator module comprises a single tooth receiving a stator winding. However, in other examples, the stator module may comprise a plurality of teeth. These teeth may receive a stator winding. For example, the stator module may comprise 2 or 3 teeth. A stator winding may be wounded in each of the teeth.

Figure 4:
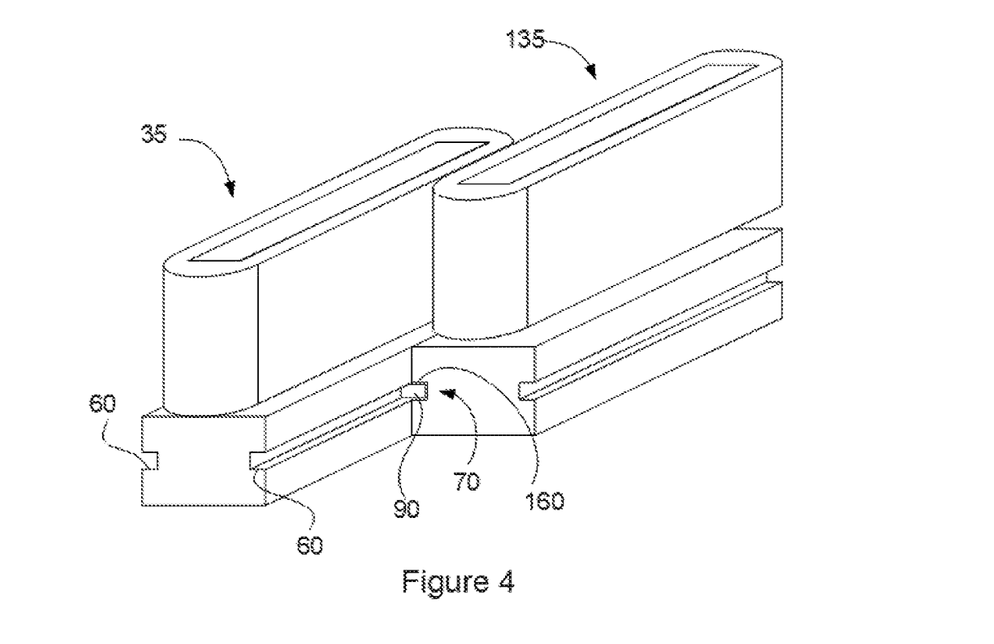
FIG. 4 schematically represents removing a stator segment from a stator.

FIG. 4 schematically represents removing one of the stator segments of FIG. 3 from a stator.

In this figure, a rod 90 is inserted in the cooling channel 70 formed by the groove 60 and the groove 160. The rod may axially slide along the cooling channel. The rod may thus be moved along a direction substantially parallel to its length. The stator segment 35 may be removed from the stator by sliding it along the rod 90. In this figure, the stator segment 135 is connected to the stator rim whereas the stator segment 35 has been released from the stator rim. For clarity purposes, the connection of the stator segments to the stator rim and a recess for receiving an anchor have not been illustrated in this figure. However, the stator segments may be connected to the stator rim according to any of the examples herein described.

As the stator segment is attached to the stator rim, the groove 160 of the stator segment 135 may retain the rod 90 in place. The upper and lower surfaces of the groove 160 may respectively contact a portion of the upper and lower surfaces of the rod to hold the rod. As a result, the rod may also limit the radial movement of the stator segment 35 being removed or inserted. Attraction forces created by the permanent magnets towards the stator module being removed or inserted may thus be counteracted. For example, the upper surfaces of the grooves and the upper surface of the rod may be flat. This may also be for the lower surfaces of the groove and the lower surface of the rod.

A portion of the rod may be retained inside the grove 160 of the stator segment 135 (fixed to stator rim). An additional tool may be connected to the rod to prevent an undesirable axial movement of the rod, i.e. to prevent a movement of the rod along its length.

The cross-section of the rod may have a cross-section similar to the cross-section of the cooling channel. In FIG. 4, the rod 90 has a substantially rectangular cross-sectional shape, like the cooling channel 70. Other shapes of rods and cooling channels may also be suitable. In these examples, the rod may substantially engage the cooling channel.

Figure 5:
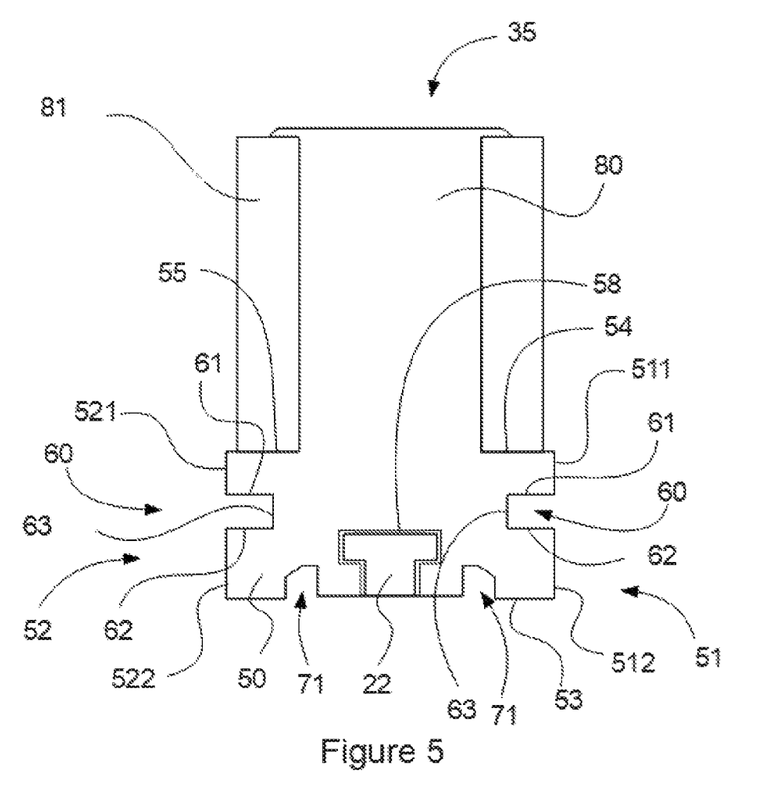
FIG. 5 schematically represents a cross-sectional view of a stator segment according to one example of the present disclosure.

FIG. 5 schematically represents a cross-sectional view of a stator segment according to one example of the present disclosure.

The stator segment 35 of FIG. 5 comprises a base 50 and a tooth 80 protruding from the base 50, which receives a stator winding 81. The base 35 comprises a bottom surface 53 and a first side surface 51 and a second side surface 52. In this example, the first 51 and the second side surfaces 52 comprise an axially extending groove 60. The axially extending grooves 60 comprise an upper surface 61 and a lower surface 62. The upper surface 61 and the lower surface of this figure are flat and substantially perpendicular to the first side surface 51 and to the second side surface 52.

In this example, the grooves further comprise an inner surface 63 connecting the upper surface 61 to the lower surface 62. The inner surface 63 may be substantially flat and may extend substantially perpendicular to the upper surface 61 and to the lower surface 62. The grooves may thus have a rectangular or square cross-sectional shape. In some examples, a transition between the surfaces of the groove may be rounded. Magnetic lines fluxing from one stator segment to an adjacent stator segment may have a smoother transition around the cooling channel.

A cooling channel may be formed by the groove 60 of the first side 51 of the stator segment of this figure and a groove a first side of an adjacent or a neighboring stator segment (not illustrated in FIG. 5). The cooling channel may have a rectangular cross-sectional shape. The rod may thus have a rectangular or square shape to fit the cooling channel.

The first side surface 51 of this figure comprises a first 511 and a second portion 512. The grove 60 of the first side surface 51 may be arranged between the first 511 and the second portion 512. The second portion 512 may extend from the base 53 to the lower surface 62 of the groove 60. The first portion 511 may extend from the upper surface 61 to a first support surface 54. The groove 60 of the first side surface 51 may thus be arranged relatively close to the electrical winding 81 to be cooled.

In some examples, a length of the second portion 512 may be longer than a length of the first portion 511. A length of the second portion refers to a distance between the bottom surface 53 and the lower surface 62 of the groove 60. A length of the first portion refers to a distance between the lower surface 61 of the groove 60 and the first support surface 54 at which the electrical windings may rest on.

Like described with respect to the first side surface 51, the second side surface 52 may also comprise a first 521 and a second portion 522. The groove 60 may be arranged between the first 521 and the second portion 522. And for example, the length of the second portion 522 may be longer than the length of the first portion 512.

In some examples, the length of the first portions 511, 521 may be longer or equal than the length of the second portions 512, 522.

The base may comprise a first support surface 54 connecting the first side surface 51 to the tooth 80 and a second support surface 55 extending from the second side surface 52 to the tooth. The support surfaces may connect the first portions of the side surfaces to the tooth, wherein the support surfaces may contact the stator winding. The stator winding 81 may be wounded around the tooth 80 and may abut against the first support surface 54 and against the second support surface 55. The support surfaces may be substantially parallel to the bottom portion 53 and substantially perpendicular to the side surfaces.

The bottom surface 53 of this example comprises a central recess 58 to receive an anchor 22 to fix the stator segment to a stator rim. In particular, the anchor of FIG. 5 may be according to the anchor of FIG. 3. In other examples, other fixing systems may also be suitable.

The base 50 may comprise additional cooling channels. In FIG. 5, these additional cooling channels 71 are formed on the bottom surface 53 of the base 50. However, these additional cooling channels are more far away from the stator windings and from the air gap of the electrical machine than the cooling channels defined by the grooves of the first sides of two adjacent stator segments. The cooling effect is therefore enhanced by the cooling channels formed between two neighboring stator segments.

Figure 6:
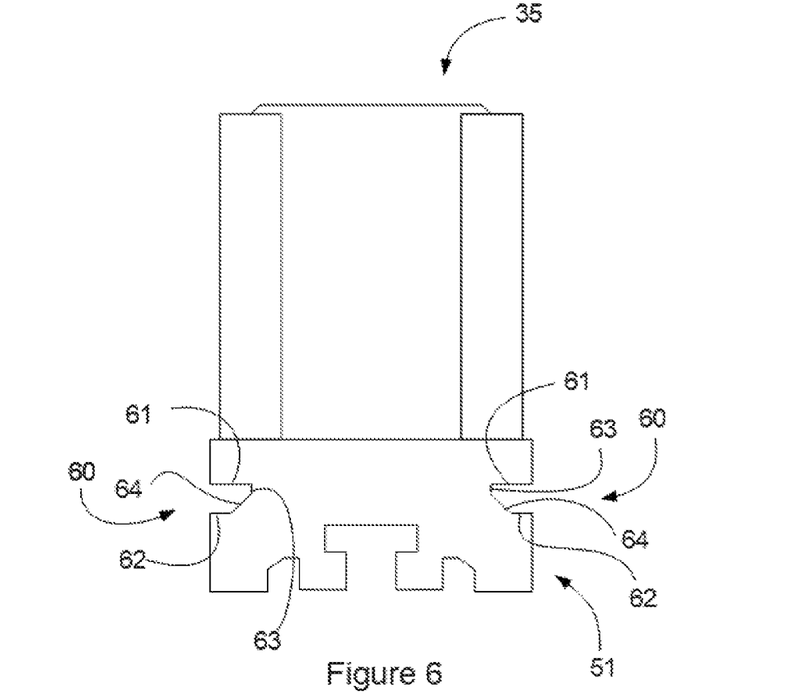
FIG. 6 schematically represents a cross-sectional view of a stator segment according to another example of the present disclosure.

FIG. 6 schematically represents a cross-sectional view of a stator segment according to another example of the present disclosure. The stator segment 35 of FIG. 6 is similar to the stator segment illustrated in FIG. 5, however the groove has a different shape. The grooves of the stator segment of FIG. 6 have a substantially wedge shape. The grooves 60 of this figure comprise an upper surface 61 and a lower surface 62. The upper surface 61 may be parallel to the lower surface 62. These upper and lower surfaces may be flat and substantially perpendicular to the first lateral side 51 and to the second lateral side 52. In addition, the grooves of this figure comprise an inner surface 63 and an inclined surface 64. The inner surface and the inclined surface of this figure are substantially flat.

The inner surface 63 may extend from the upper surface 61 to the inclined surface 64. The inner surface 63 may extend substantially perpendicular to the upper surface 61. The inclined surface 64 may extend from the inner surface 63 to the lower surface 62. The inclined surface 64 may form an angle higher than 90° with respect to the inner surface 63 and with the lower surface 64. Distribution of magnetic lines fluxing from one stator segment to an adjacent stator segment may be improved as the magnetic lines around the cooling channel may have a smooth transition. Electrical losses of the electrical machine, e.g. a wind turbine generator, may thus be reduced. In some examples, edges between the flat surfaces of the groove may be rounded. Distribution of the flux density may be further improved.

A stator of a wind turbine generator may comprise a plurality of stator segments according to any of the examples herein disclosed. Specifically, a direct-drive wind turbine generator may comprise a stator supporting a plurality of stator segments according to any of the examples herein disclosed.

Figure 7:
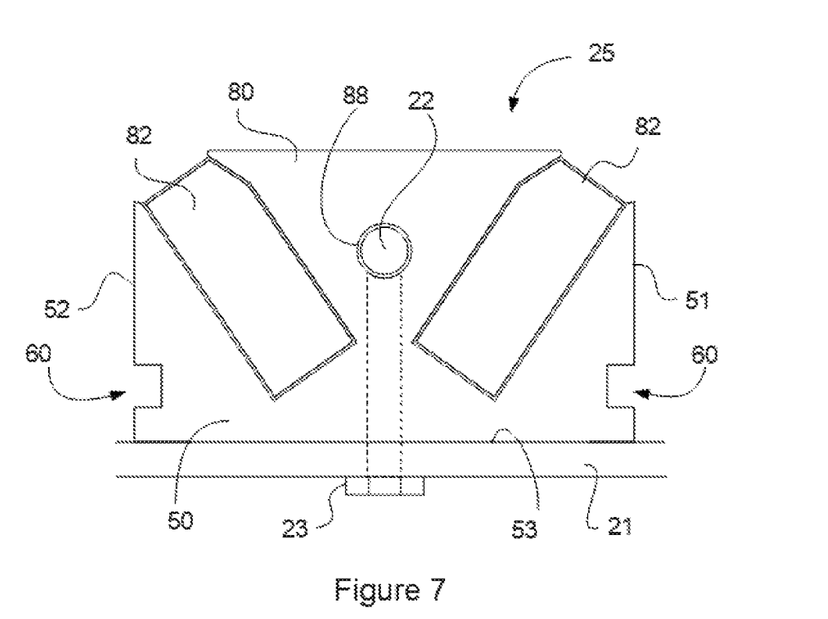
FIG. 7 schematically represents a cross-sectional view of a permanent magnet module according to one example of the present disclosure.

FIG. 7 schematically represents a cross-sectional view of a permanent magnet module 25 according to one example of the present disclosure. A permanent magnet module is an example of an electromagnetic module of an electrical machine.

The permanent magnet module 25 of FIG. 7 comprises a base 50 and a support 80 extending from the base 50 supporting at least one permanent magnet 82. The base comprises a bottom surface 53 and a first side surface 51. The first side surface 51 comprises an axially extending groove 60 defining a cooling channel with an axially extending groove of a first side surface of an adjacent permanent magnet module.

In this example, the base 50 further comprises a second side surface 52 having a groove which may define a cooling channel with a groove of side surface of an adjacent permanent magnet module.

In this example, the permanent magnets 82 are retained inside axial apertures perforated between the base 50 and the support 80. The support 80 may be a flux concentrator. In this example, the permanent magnets have a V-shape configuration. The permanent magnets may thus be outwardly inclined.

In some examples, the support may be adjustable connected to the base to clamp a pair of permanent magnets in between. In further examples, permanent magnets may also be arranged in a flat configuration.

In the example of FIG. 7, the support 80 comprises an axial hole 88 to receive an anchor 22. In this example, the axial hole 88 and the anchor 22 has a substantially circular cross-sectional shape. A bolt 23 may pass through a radial hole of the rotor rim 21 to be connected the anchor 22. The bolt 23 may be screwed onto a threaded hole of the anchor 22. In some examples, a plurality of bolts may be screwed onto a plurality of threaded holes of the anchor 22.

In other examples, the anchor may have a different shape. For example, the anchor may have a rectangular shape or a T-shape. The axial hole may thus have a similar shape.

In further examples, the axial hole to receive the anchor may be arranged on the base. The base may comprise a recess and the permanent magnet module may be attached to the rotor rim with an anchor according to any of the examples herein disclosed with respect to stator windings connected to the stator rim.

The grooves of FIG. 7 comprise a parallel flat upper and a lower surface as described with respect to the examples of grooves of stator segments. In this respect, the groove may be according to any of the examples herein described.

The permanent magnet of this figure may be removed from a rotor or inserted in a rotor using a rod as described with respect to the examples of removing a stator segment.

A wind turbine generator may comprise a plurality of permanent magnet modules according to any of the examples herein disclosed. The wind turbine generator may be a direct drive wind turbine generator. The wind turbine generator may also comprise a plurality of stator segments according to any of the examples herein disclosed.

Figure 8:
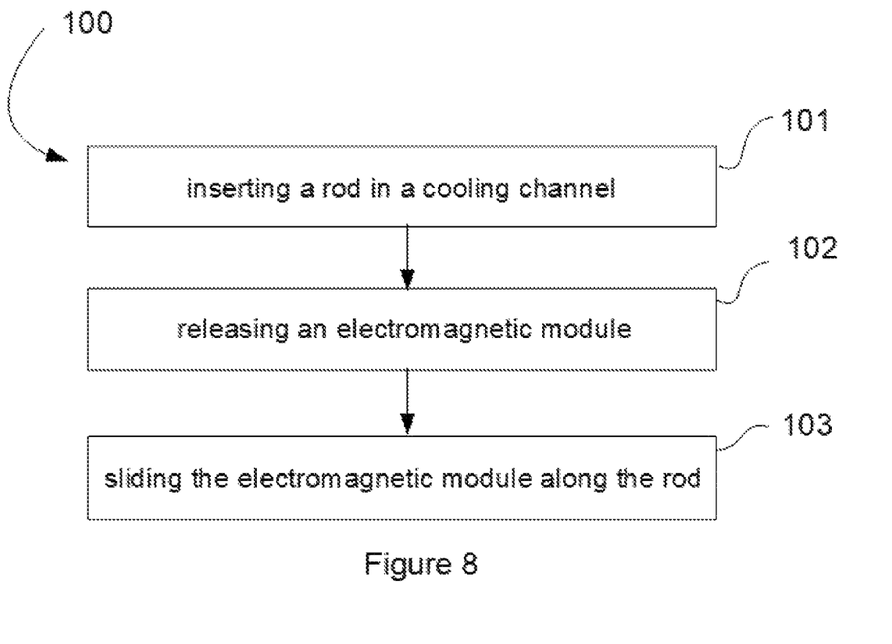
FIG. 8 shows a flow diagram of an example according to the present disclosure of a method for removing an electromagnetic module from an electrical machine.

FIG. 8 shows a flow diagram of an example according to the present disclosure of a method 100 for removing an electromagnetic module from an electrical machine.

The electrical machine comprises a rotor and a stator. Furthermore, the electrical machine comprises a plurality of electromagnetic modules connected to a structure of the electrical machine. In some examples, the structure of the electrical machine may comprise a stator rim or a rotor rim. The electromagnetic module may be a stator segment or permanent magnet module according to any of the examples herein disclosed.

The electromagnetic module comprises a base and a support extending from the base supporting an electromagnetic material. The electromagnetic material may be one of a permanent magnet and a stator winding. The electromagnetic module comprising a permanent magnet may be a permanent magnet module. The electromagnetic module comprising a stator winding may be a stator segment.

The base of the electromagnetic module comprises a bottom surface and a first side surface. The first side surface comprises an axially extending groove defining a cooling channel with an axially extending groove of a first side surface of an adjacent electromagnetic module.

At block 101, inserting a rod in the cooling channel formed by the groove of the electromagnetic module to be removed and the groove of the adjacent electromagnetic module is provided. The rod may thus be retained inside the cooling channel.

The rod may engage the cooling channel. The groove forming the cooling channel may comprise an upper and a lower surface extending substantially perpendicular to the first side surface. The rod may comprise two surfaces configured to rest on the upper surface and on the lower surface of the grooves forming the cooling channel. The upper and lower surfaces of the rod and the grooves may be substantially flat.

Releasing the electromagnetic module to be removed from the structure of the electrical machine is represented at block 102. The electromagnetic module to be removed may be attached to the stator rim or to the rotor rim according to any of the examples herein described.

In some examples, releasing or disconnecting the electromagnetic module to be removed may comprise loosening fasteners connecting the electromagnetic module to the structure of the electrical machine. In some examples, these fasteners may be bolts connecting the structure of the electrical machine to an anchor arranged on a recess or a hole of the electromagnetic module.

A rod inserted inside the cooling channel formed between the electromagnetic module to be removed and the adjacent electromagnetic module may retain a radial movement of the electromagnetic module to be removed.

The method may further comprises retaining the rod inside the groove of the adjacent stator segment, which is fixed to the structure of the electrical machine. For example, an additional tool may prevent an axial movement of the rod along the groove. This may help to facilitate removing the electromagnetic module to be removed.

At block 103, sliding the electromagnetic module to be removed along the rod is represented. The electromagnetic module may axially slide and the rod may maintain the radial position of the electromagnetic module. For example, if the electromagnetic module is a stator segment, the distance between the stator segment sliding along the rod and the permanent magnets arranged on the rotor may thus be maintained. Accordingly, electromagnetic forces attracting or repelling the electromagnetic modules may be counteracted.

Figure 9:
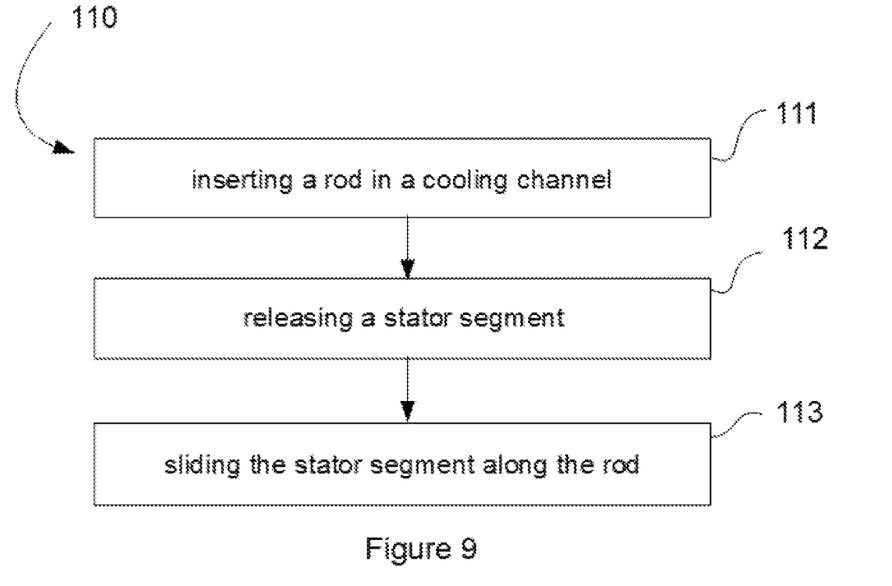
FIG. 9 shows a flow diagram of an example according to the present disclosure of a method for removing a stator segment from a stator.

FIG. 9 shows a flow diagram of an example according to the present disclosure of a method 110 for removing a stator segment from a stator.

The stator comprises a plurality of stator segments connected to a stator rim. The stator segments may be according to any of the examples herein disclosed.

The stator segments may comprise a base and a tooth protruding from the base and supporting a stator winding. The base may comprise a bottom surface to contact the stator rim and a first side surface. The first side surface may comprise an axially extending groove. This groove may form a cooling channel with an axially extending groove of a first side surface of an adjacent stator segment.

In some examples, the groove may be arranged between a first and a second portions of the first side surface. In some examples, the stator segments may further comprise a second side surface having a groove.

The groove may be according to any of the examples herein disclosed. For example, the groove may comprise a flat upper surface and a flat lower surface. These surfaces may extend perpendicular to the first side surface.

The groove may further comprise an inner surface and an inclined surface. The inner and the inclined surfaces may be substantially flat. The inner surface may extend from the upper surface to the inclined surface. The inclined surface may connect the inner surface to the lower surface. The inclined surface may form an angle higher than 90° with respect to the inner surface and to lower surface. In some examples, a transition between flat surfaces of the groove may rounded. With these shapes, magnetic lines fluxing through the base may be guided around the cooling channel in a smooth way, reducing magnetic losses.

At block 111, inserting a rod in the cooling channel formed by the groove of the stator segment to be removed and the groove of the adjacent stator segment is provided. The rod may axially slide along the cooling channel. The rod may thus be retained inside the cooling channel. An upper or a lower surface of the rod may contact the upper or the lower surfaces of the grooves forming the cooling channel. These surfaces may be substantially flat. The rod may thus be retained inside the cooling channel. The rod may have a shape substantially similar shape to the cross-section of the cooling channel.

Block 112 represents releasing the stator segment to be removed from the stator segment. This may comprise loosening fasteners connecting the stator segment to the stator rim. The stator segment to be removed may be connected to the stator rim according to any of the examples herein disclosed.

Block 113 represents sliding the stator segment to be removed along the rod. The rod is retained by the groove of the adjacent stator segment. The stator segment is prevented from being moved towards the permanent magnet modules of the rotor. The rod may be retained inside the groove of the adjacent stator segment to prevent sliding together with the stator segment being removed.

Figure 10:
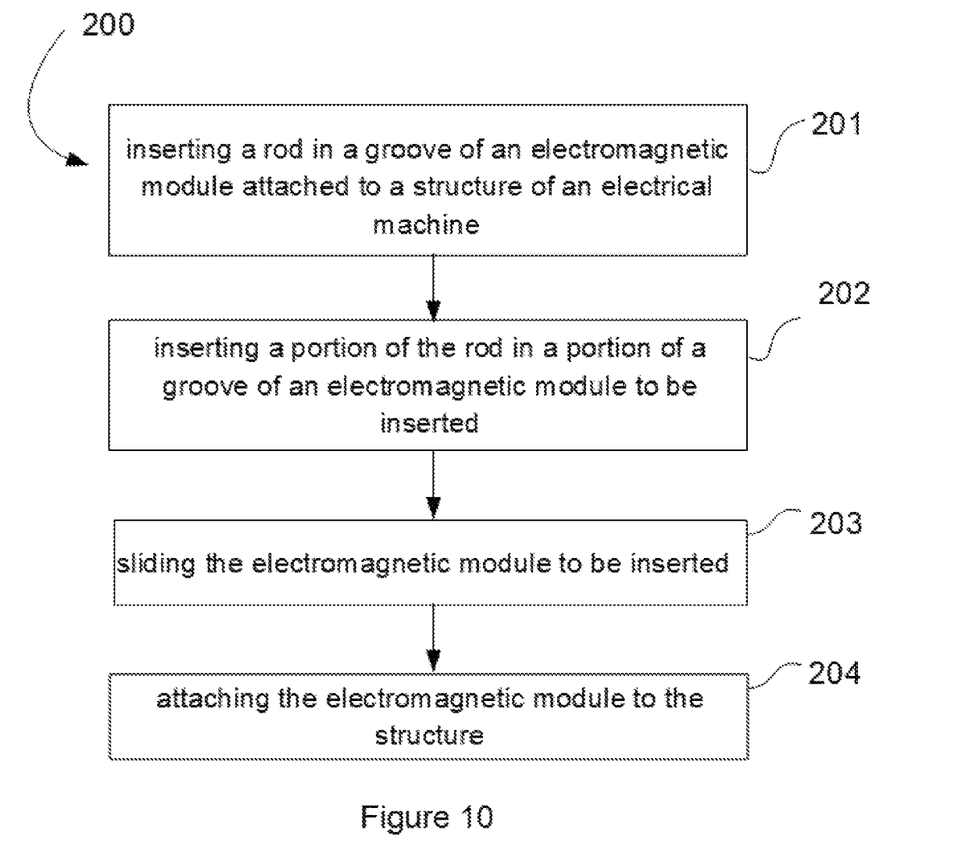
FIG. 10 shows a flow diagram of an example of a method for inserting an electromagnetic module to an electrical machine.

FIG. 10 shows a flow diagram of an example of a method 200 for inserting an electromagnetic module to an electrical machine.

The electrical machine comprises a rotor and a stator. Furthermore, the electrical machine comprises a plurality of electromagnetic modules connected to a structure of the electrical machine. The electromagnetic modules may be according to any of the examples herein disclosed. In some examples, the structure of the electrical machine may comprise a stator rim or a rotor rim. The electromagnetic module may be a stator segment or permanent magnet module according to any of the examples herein disclosed.

The base of the electromagnetic module comprises a bottom surface and a first side surface. The first side surface comprises an axially extending groove defining a cooling channel with an axially extending groove of a first side surface of an adjacent electromagnetic module.

At block 201, inserting a rod in the groove of an electromagnetic module attached to a structure of the electrical machine. The rod may thus be retained inside the groove of this electromagnetic module.

Inserting a portion of the rod in a portion of the groove of the electromagnetic module to be inserted is represented at block 202. The electromagnetic module may be positioned close to the electrical machine such that to groove can receive a portion of the rod.

At block 203, sliding the electromagnetic module to be inserted along the rod to position the electromagnetic module to be inserted adjacent to the electromagnetic module attached to the structure of the electrical machine. The electromagnetic module may axially slide along the rod. The rod may thus radially retain the electromagnetic module being inserted.

At block 204, the electromagnetic module is attached to the structure of the electrical machine. In this way, after positioning the electromagnetic module by sliding it along the rod, the electromagnetic module may be attached to the structure of the electrical machine. The electromagnetic module may be attached to the electrical machine according to any of the examples herein described.

After securing the electromagnetic module to the structure of the electrical machine, the rod may be removed.

In some examples, the electromagnetic module may comprise a stator segment with at least one stator winding and the structure of the electrical machine may comprise a stator rim of the stator. In other examples, the electromagnetic module may comprise a permanent magnet module and the structure of the electrical machine may comprise a rotor rim of the rotor.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for removing an electromagnetic module from an electrical machine having a rotor and a stator, the electrical machine comprising a plurality of electromagnetic modules having an electromagnetic material, the electromagnetic material being one of a permanent magnet and a stator winding, the electromagnetic modules comprising:
   a base and a support extending from the base and supporting the electromagnetic material, the base comprising:
      a bottom surface; and
      a first side surface comprising an axially extending groove defining a cooling channel with an axially extending groove of a first side surface of an adjacent electromagnetic module;
   the method comprising:
      inserting a rod in the cooling channel formed by the electromagnetic module to be removed and the groove of the adjacent electromagnetic module;

releasing the electromagnetic module to be removed from a structure of the electrical machine; and sliding the electromagnetic module to be removed along the rod.

2. The method according to claim 1, wherein the electromagnetic module to be removed comprises a permanent magnet module with at least one permanent magnet and the structure of the electrical machine comprises a rotor rim of the rotor.

3. The method according to claim 1, wherein the electromagnetic module to be removed comprises a stator segment with at least one stator winding and the structure of the electrical machine comprises a stator rim of the stator.

4. The method according to claim 1, wherein releasing the electromagnetic module to be removed comprises loosening fasteners connecting the electromagnetic module to be removed to the structure of the electrical machine.

5. The method according to claim 1, further comprising using a tool to retain a portion of the rod inserted into the groove of the adjacent electromagnetic module.

6. The method according to claim 1, wherein the axially extending groove in the first side surfaces of the electromagnetic module to be removed and the adjacent electromagnetic module comprises an upper and a lower surface extending substantially perpendicular to the respective first side surface.

* * * * *